July 25, 1967 B. J. WATKINS 3,332,484
SUBSEA WELL CONTROL TUBE METHODS AND APPARATUS
Filed Nov. 29, 1963 6 Sheets-Sheet 1
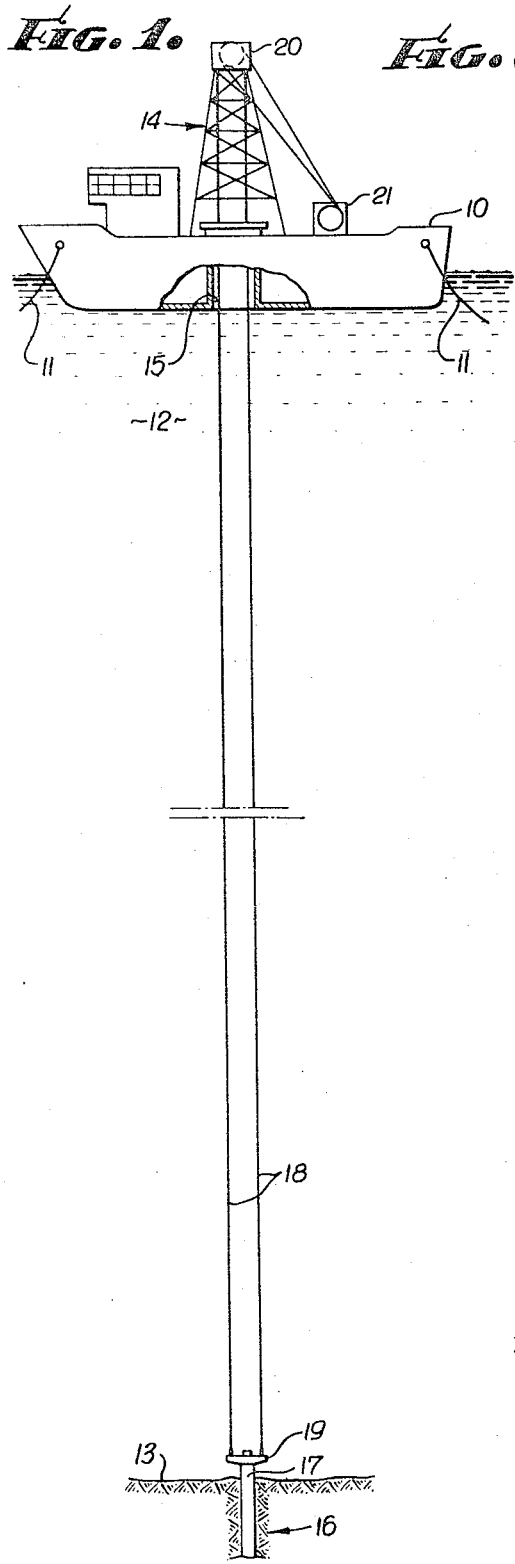
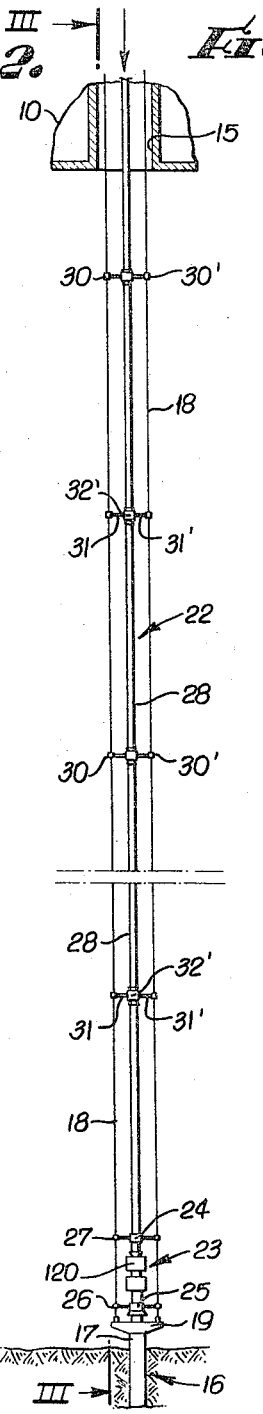
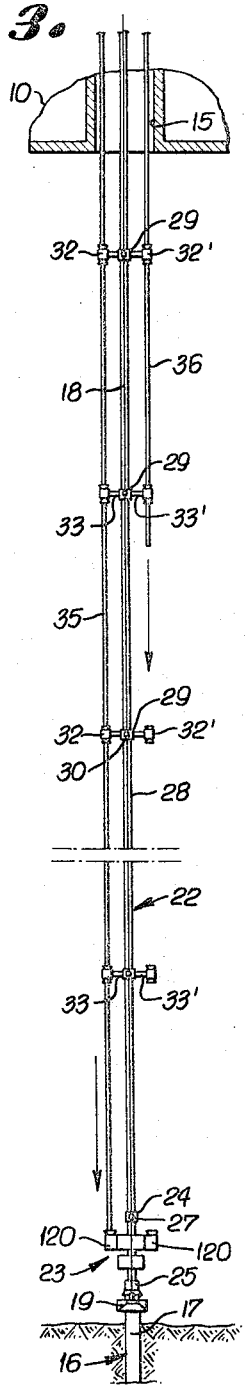
INVENTOR.
BRUCE J. WATKINS
BY Miketta & Glenny
ATTORNEYS.

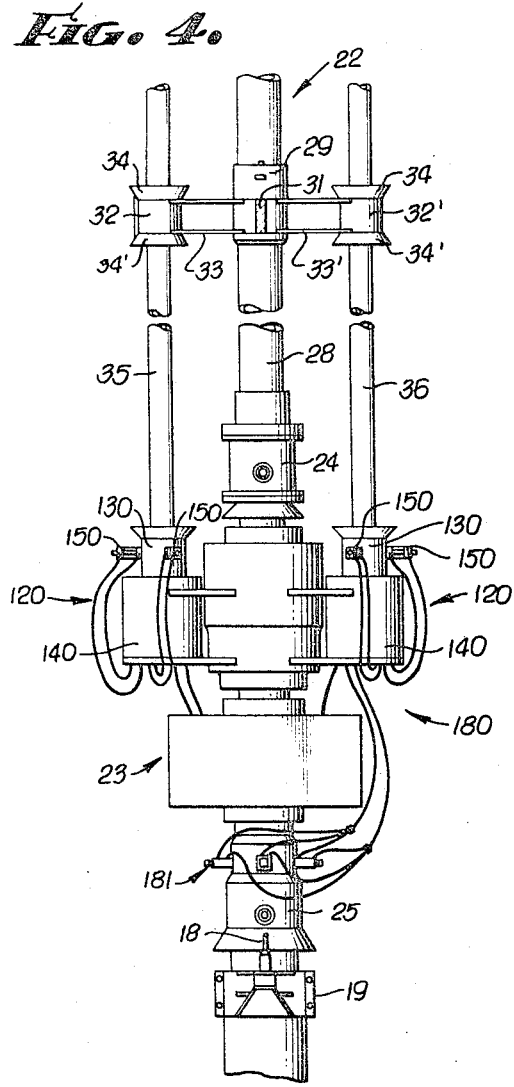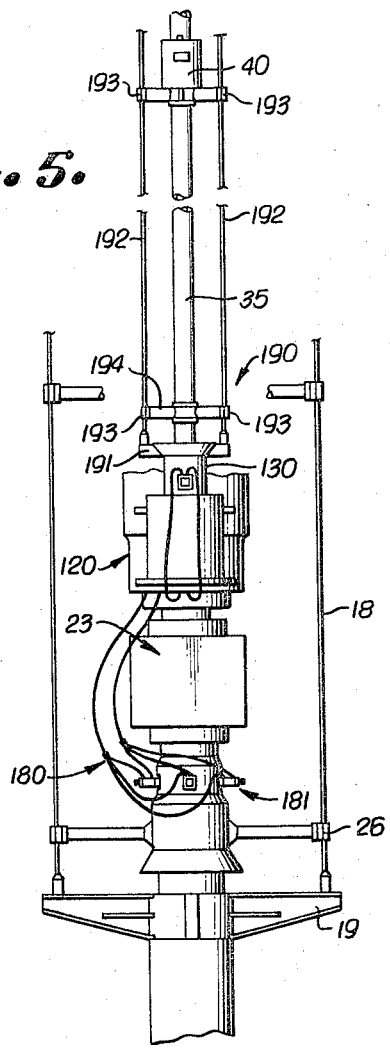

July 25, 1967 B. J. WATKINS 3,332,484
SUBSEA WELL CONTROL TUBE METHODS AND APPARATUS
Filed Nov. 29, 1963 6 Sheets-Sheet 3
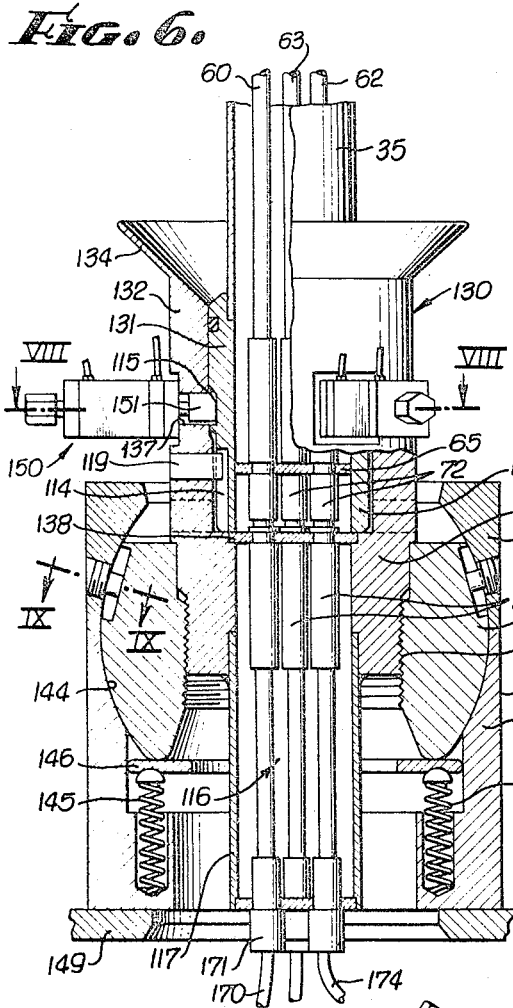
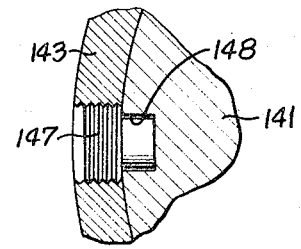
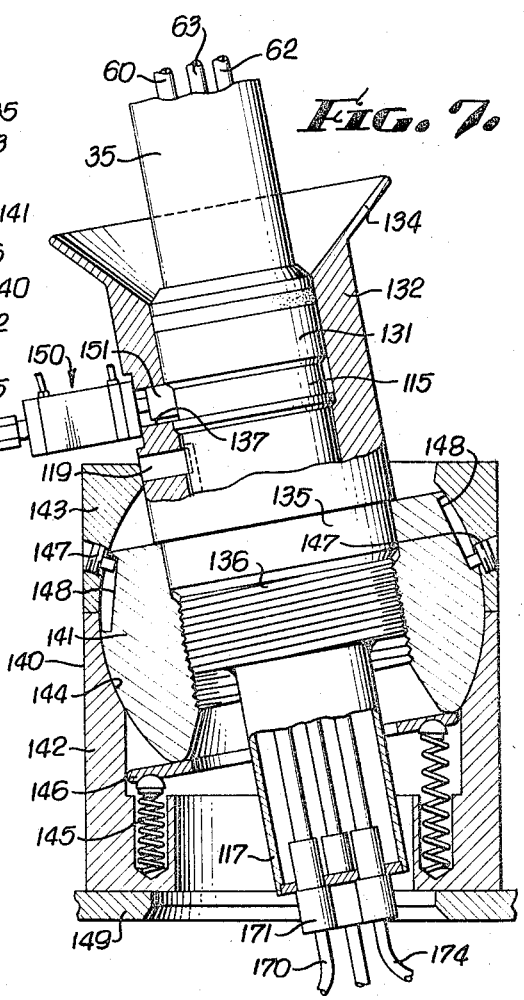
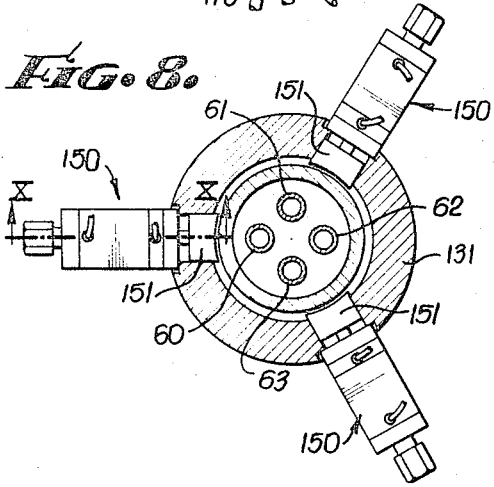
INVENTOR.
BRUCE J. WATKINS
BY Miketta & Glenny
ATTORNEYS.

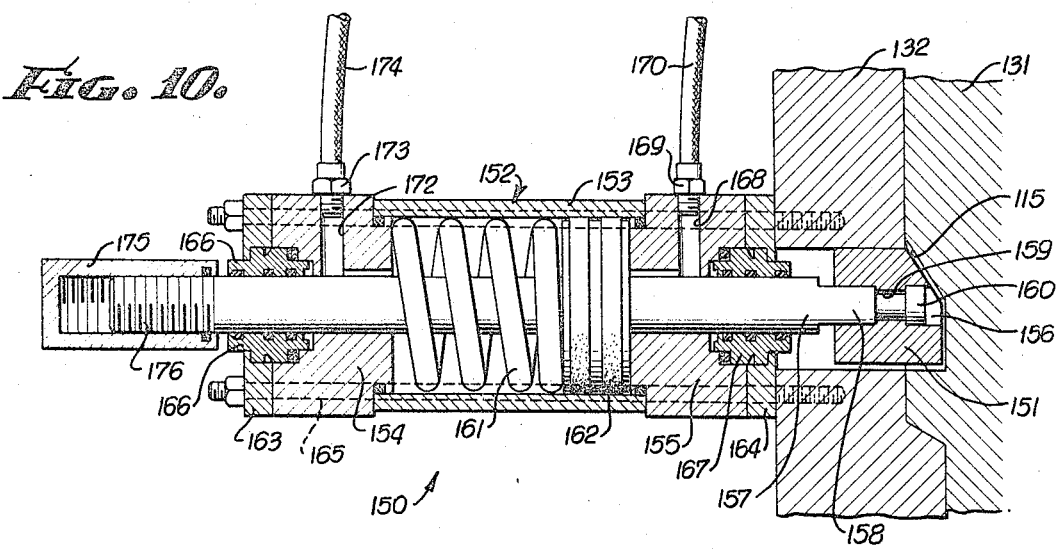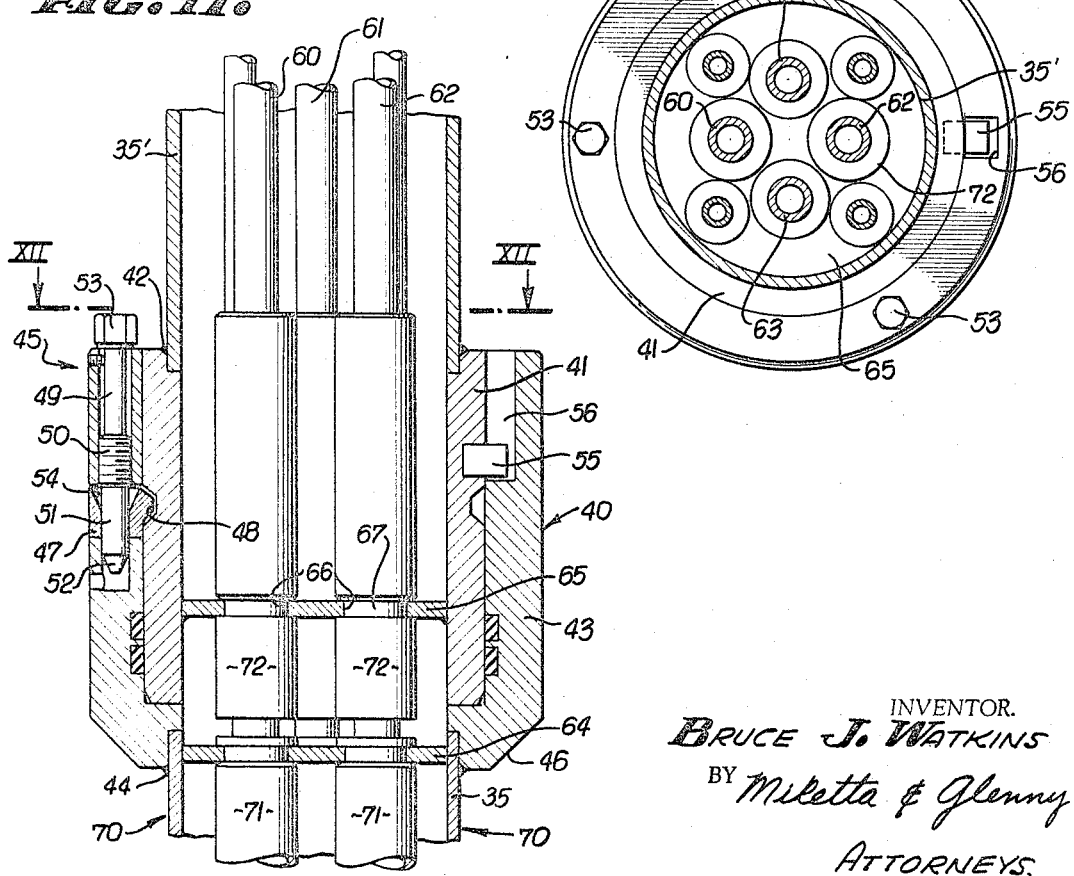

July 25, 1967   B. J. WATKINS   3,332,484
SUBSEA WELL CONTROL TUBE METHODS AND APPARATUS
Filed Nov. 29, 1963   6 Sheets-Sheet 5

INVENTOR.
BRUCE J. WATKINS
BY Miketta & Glenny
ATTORNEYS.

July 25, 1967  B. J. WATKINS  3,332,484
SUBSEA WELL CONTROL TUBE METHODS AND APPARATUS
Filed Nov. 29, 1963  6 Sheets—Sheet 6
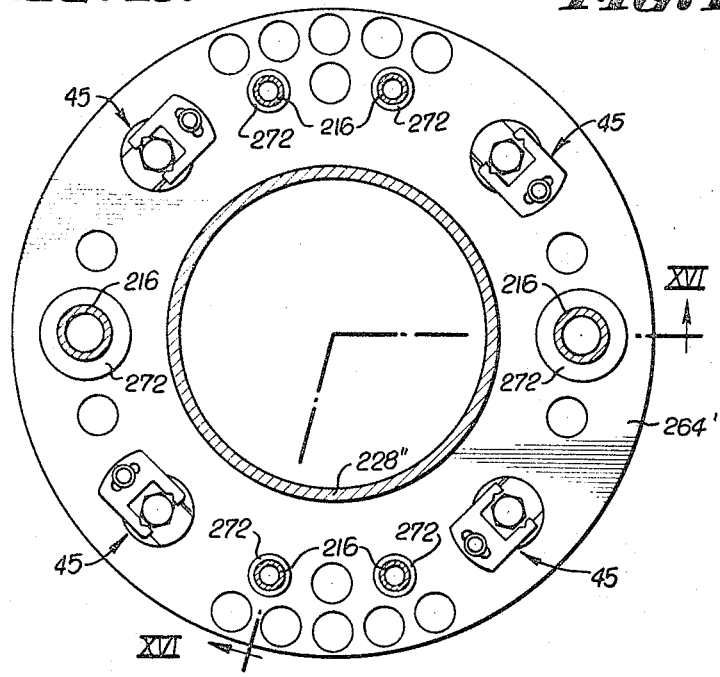
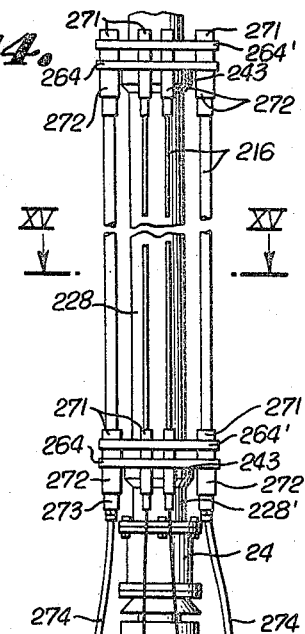
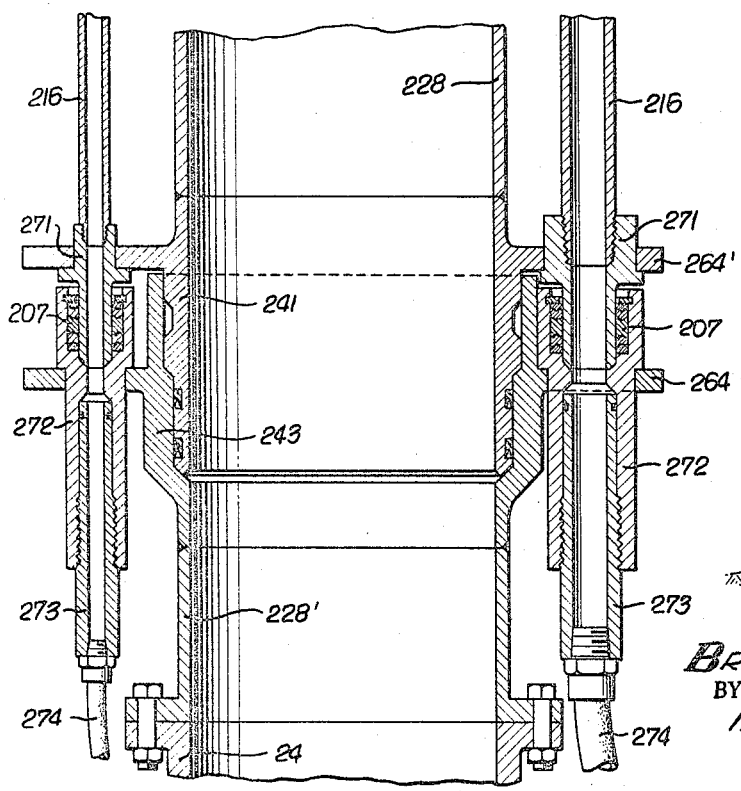
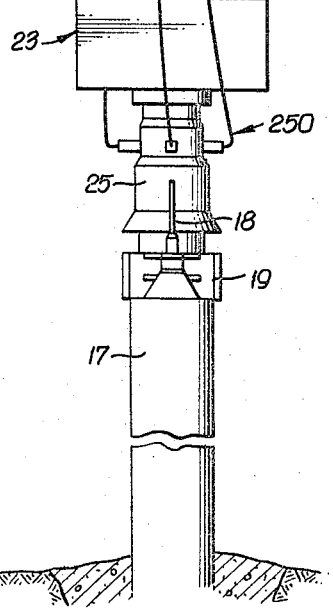
INVENTOR.
BRUCE J. WATKINS
BY Miketta & Glenny
ATTORNEYS.

United States Patent Office 3,332,484
Patented July 25, 1967

3,332,484
SUBSEA WELL CONTROL TUBE METHODS
AND APPARATUS
Bruce J. Watkins, Palos Verdes Estates, Calif., assignor to Regan Forge & Engineering Co., San Pedro, Calif., a corporation of California
Filed Nov. 29, 1963, Ser. No. 326,917
23 Claims. (Cl. 166—.6)

This invention relates generally to apparatus and methods for controlling hydraulically actuated controls at a subsea well head remote from a floating vessel or platform during drilling, completion, production or re-entry operations on a subsea well. More particularly, the apparatus according to the present invention relates to multiple control tube apparatus for providing a plurality of hydraulic fluid conduits between the floating vessel and subsea well and associated apparatus to guide the control tube apparatus to the well head, latch thereto and automatically effect a fluid tight connection with control devices at the well head. The methods of the present invention relate, more particularly, to methods of assembling, guiding and establishing a plurality of hydraulic fluid control lines between a subsea well and a remote floating platform or vessel to operate control devices at the well head during drilling, completion, re-entry or production operations from the remote platform or vessel.

At present, and in the past, it has been common to operate the hydraulically actuated controls at the subsea well head during drilling, completion, production and re-entry operations by running flexible hydraulic fluid hoses from large reels on board the floating vessel or platform to the various well head controls. In deep water well operations, considerable lengths of hoses are required to store such hoses has become overburdensome and expensive. Because of the weight of such hoses, various kinds of buoys also have had to be employed in conjunction with them, requiring additional equipment carried on the vessel and additional handling operations. Further, such hoses may tend to become entangled with each other or other objects below the sea under the churning effect of subsea currents and are subject to wear and leakage. Also, the establishing of a fluid tight connection between the hoses and the well head controls by a diver at a considerable distance below the sea is difficult and, in below diver depths, perhaps not possible at all. If the hoses are connected to these controls prior to placing them at the well head, the running and removal of controls or hoses for repairs and/or adjustment is extremely complicated.

It is therefore an object of this invention to disclose and provide apparatus and methods for establishing a plurality of hydraulic fluid conduits between a floating vessel or platform remote from a well head to control hydraulically actuated well head controls, latches or other devices wherein the large hose reels on board the vessel are eliminated, the apparatus employed is easily stored when not in use, additional buoys are not required, the conduits are not subject to wear or leakage and the connections between the plurality of conduits and the subsea well controls at the well head are automatically effected on running of the conduits to the well without the use of divers and the conduits may be independently connected and disconnected and even removed without disturbing the well head apparatus by operations on board the vessel, all without loss of hydraulic fluid in the conduits or pressures in the well or controls such as a blow out preventer.

It is a primary object of the present invention to disclose and provide a multiple control tube method and apparatus for use at a subsea well installation where hydraulically actuated controls at the well head are to be operated from a remote floating platform by control tubes provided in a plurality of sections easily stored on board the vessel and which can be easily assembled together on the platform and run to the well.

It is another object to disclose and provide multiple control tube methods and apparatus wherein the tubes are of strong rigid metal construction to resist wear and leakage and connecting means are provided on the ends of each tube section to automatically effect fluid tight connection between aligned tubing sections joined by the assembly of the casing means.

It is a further object of the present invention to disclose and provide guide means to cooperate with a multiple control tube apparatus, including a plurality of casing sections having a plurality of tubing sections associated with each casing section, whereby the casing section may be assembled on board a floating vessel and run to a subsea well head through the guide means.

It is another object of the present invention to disclose and provide remotely operable latching means to be disposed at a well head for reception and automatic latching or unlatching of a multiple control tube apparatus run to the well head and which may further include the provision of connector means to selectably interconnect the multiple control tube apparatus to hydraulically actuated control devices at the well head.

It is another object of the present invention to disclose and provide a hydraulically releasable spring actuated latching means for use at a subsea well capable of automatically latching onto a casing brought into contact therewith and be remotely released by application of hydraulic pressure from a remote floating vessel or platform.

It is an object of the present invention to disclose and provide a tube or conduit connecting means to interconnect the ends of two fluid conduits wherein the conduits are securely sealed against fluid flow therethrough when disengaged or connection only after the application of a predetermined fluid pressure in one of said tubes or conduits.

It is another object of this invention to disclose and provide a tube or conduit connecting means as in the foregoing object wherein hydraulic fluid in a control tube conduit above the connecting means will not be lost nor internal tube pressure in the other associated tube below the connector released on disengagement of the connecting means, and wherein an application of fluid pressure in the control tube above the connection of a preselected amount, in excess of that caused by the weight of the fluid within the control tube, is applied to the connector means from the floating vessel, the connecting means opens to bring the connected tubes into fluid communication.

It is a further object of the invention to disclose and provide a control tube apparatus which can be employed at a subsea oil well installation wherein conductor casings are assembled and run from a floating platform to a head of a subsea well and hydraulically actuated well control apparatus are to be operated by remote control from the platform, wherein the hydraulic control lines are provided in sections mounted to the conductor casings and are automatically assembled, carried through guides and connected to the well head by the assembly and running of the casings to the well.

It is another object of the invention to disclose and provide a method of controlling the operation of hydraulically actuated devices at a subsea well head without the use of flexible hydraulic hoses suspended between a floating platform and well head by mounting tubing sections to casing sections and assembling, carrying, guiding and connecting the hydraulic control tubing on the assembly, running and connection of the casing sections.

It is a further object of this invention to disclose and provide a method of establishing a plurality of hydraulic fluid control lines between a subsea well head assembly and a remote floating platform by first establishing guide means between the platform and well head; assembling rigid casing sections on board the platform and running them to the well head through said guide means; assembling and running control tubes for conveying hydraulic pressure fluid concurrently with the assembly and running of the casing sections; and concurrently latching the bottom ends of the casings and tubes to the well head assembly automatically on engagement therewith.

It is still a further object to provide a method as in the foregoing object wherein the control tubes and associated casing means can be run independently of other casings run to the well head and may be latched and unlatched remotely therefrom by operations conducted from the platform.

These and various other objects and advantages of the present invention will be apparent to those skilled in art from a consideration of the following detailed description of exemplary embodiments of the apparatus and methods according to the present invention, reference being made to the appended sheets of drawings in which:

FIG. 1 is an elevation depicting a floating platform or vessel over a subsea well site or formation with guide means interconnecting the vessel and well head;

FIG. 2 is an elevation of the vessel, well site and guide means with additional guide means assembled to a conductor pipe or casing run from the vessel to the well head and depicting a well head assembly at the lower end of the conductor assembled to the well head;

FIG. 3 is the elevation of FIG. 2 taken therein along the plane III—III with an exemplary multiple control tube apparatus, according to the present invention, partly run to the well head assembly from the floating vessel;

FIG. 4 is a detail elevation of a portion of the apparatus of FIGS. 2 and 3 showing the well head assembly and exemplary multiple control tube apparatus, according to the invention;

FIG. 5 is an alternative exemplary embodiment of multiple control tube apparatus and associated guide means;

FIG. 6 is a detail view of the exemplary latching receptacle means and associated ball joint of FIGS. 4 and 5;

FIG. 7 is a view of the devices of FIG. 6 with the latching receptacle tilted in its ball joint;

FIG. 8 is a sectional view of the latching receptacle means of FIG. 6 taken therein along the plane VIII—VIII;

FIG. 9 is a detail view of a portion of the ball joint of FIGS. 6 and 7 taken along the plane IX—IX in FIG. 6;

FIG. 10 is a sectional view of an exemplary latch mechanism employed with the latching receptacle means of FIGS. 6 through 8 taken along the plane X—X in FIG. 8;

FIG. 11 is a vertical section through the exemplary control tube casing coupling of FIGS. 4 and 5 showing exemplary tube connecting means;

FIG. 12 is a cross sectional view of the coupling and connecting means of FIG. 11 taken therein along the plane XII—XII;

FIG. 14 is an elevation of an alternative exemplary multiple control tube apparatus according to the present invention;

FIG. 15 is a cross section of the apparatus of FIG. 14 taken therein in the plane XV—XV; and FIG. 16 is a vertical section taken in the apparatus of FIG. 15 along the plane XVI—XVI.

Figure 13:
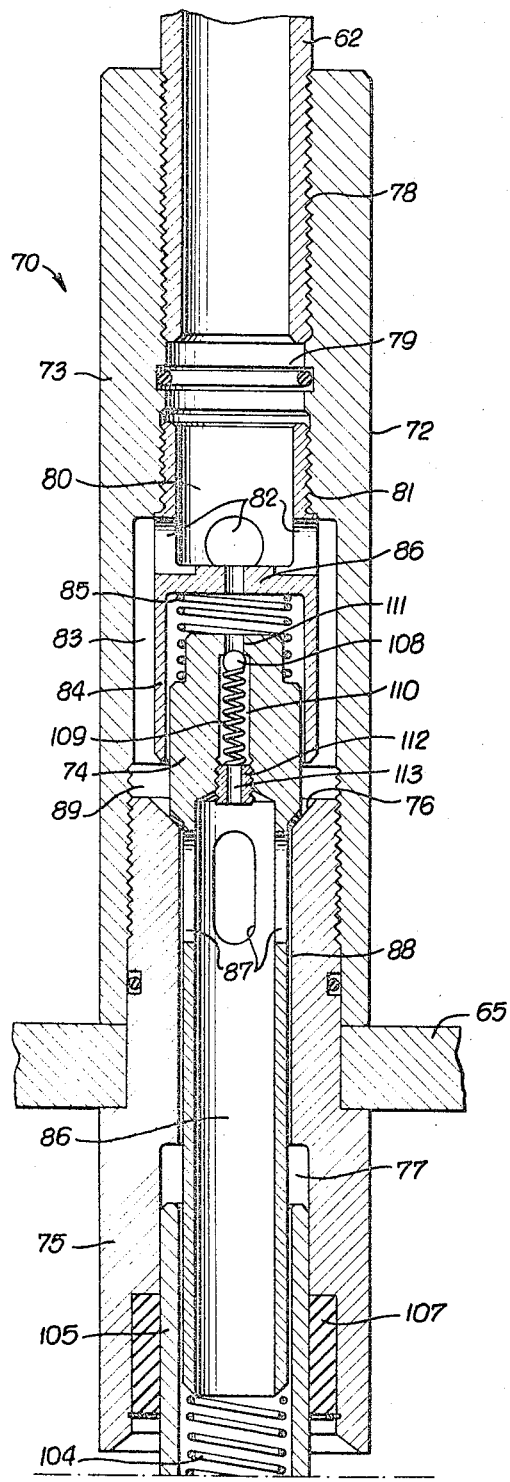
FIGS. 13 and 13a are a cross section of an exemplary control tube connecting means including a pair of check valves and a third by-passing check valve according to the present invention.

Referring first to FIG. 1, a floating vessel or platform, such as the ship 10, is first anchored by the anchor lines 11 in a body of water 12 above a subsea formation 13. The vessel or ship 10 is provided with a conventional drilling rig, indicated generally at 14, positioned over a cellar or slot 15 through the center of the vessel. A previously drilled well is indicated generally at 16 in the formation 13 with a conductor pipe 17 cemented into place. Conductor pipe 17 may be set in the well by any conventional method, as for example, by being stripped down over the drilling pipe by means of the guide lines 18 bolted to the guide line frame 19 attached to the conductor pipe 17. The guide lines 18 may be run over a crown block 20 and wound or unwound by the winch or draw works 21. The showing of FIG. 1 is considered to be a conventional subsea oil well installation with a plurality of guide lines interconnecting the floating vessel or ship 10 with a subsea oil well, indicated generally at 16.

As shown in FIG. 2, a marine conductor, indicated generally at 22, is then run on the guide lines 18 down to the conductor pipe 17. A blow-out preventer stack, indicated generally at 23, is attached by a coupling 24 to the lower end of the marine conductor and a drilling bonnet 25 is secured to the conductor below the blow-out preventer stack. Guide means 26 and 27 mounted on the drilling bonnet 25 and coupling 24, respectively, guide the marine conductor down to the well and facilitate the landing of the drilling bonnet 25 on the upper end or head of the conductor 17 set in the well, as best seen in FIG. 4. The marine conductor, indicated generally at 22, is comprised of a plurality of individual metal conductor pipes or conduits 28 coupled together by a plurality of metal marine conductor couplings 29, as best seen in FIG. 3. The marine conductor couplings 29 may comprise the marine conductor coupling as disclosed in my copending application Ser. No. 300,277, filed Aug. 6, 1963, with the exception that only a single orienting lug should be employed. The individual conductor pipes or conduits 28 are preferably coupled together by means of the coupling 29 on board the vessel or platform and the marine conductor 22 lowered through the cellar 15 to the well as it is assembled. Normally the guide means 26 on the drilling bonnet 25, and perhaps the guide means 27 on coupling 24, only would be required to land the drilling bonnet on the conductor 17. In accordance with the present invention, additional control tube casings are to be run independently to the well through guide means associated with the conductor. Therefore, assemblies of guide means are provided at spaced intervals along the marine conductor, preferably mounted by welding upon each of the couplings 29 to guide the conductor pipe relative to the guide lines 18 and guide control tube casings to the well relative to the conductor pipe 22 and guide lines 18.

Guide assemblies are associated with the marine conductor pipe, in accordance with the present invention, at spaced intervals therealong to cooperate together in guiding the marine conductor to the well and guiding subsequently run control tube casings relative to the marine conductor, but independent thereof, to the subsea well. Such guide assemblies are preferably mounted on each of the marine conductor couplings 29 and include a plurality of guide line guides to be associated with guide lines 18 and a plurality of additional guides or casing guides to be associated with later run multiple control tube casings, as subsequently described. In the preferred exemplary embodiment, as shown in FIGS. 2, 3 and 4, the plurality of guide line guides may comprise a pair of oppositely directed guides or bushings 30, 30' mounted on each coupling 29 by means of oppositely extending line guide arms 31 and 31', as best seen in FIG. 2. Line guides or line bushings 30 and 30' are provided with an internal diameter suitable to receive and slide over the conventional guide lines 18. While such guide line guides or bushings may be associated with the conductor in any suitable manner, to guide the conductor relative to the guide lines 18, it is preferred that they be mounted on the marine conductor couplings 29, as shown, in order to facilitate their incorporation into the marine conductor as it is being run to the well by the assembly of successive marine conductor couplings into the marine conductor.

Additional guide means or casing guide means are also provided in accordance with the present invention in each of the guide means assemblies provided on each of the marine conductor couplings 29. In the exemplary embodiment, such casing guide means, as best shown in FIG. 3, comprise a pair of casing guides or casing bushings 32 and 32' mounted on each marine conductor coupling 29 by means of a pair of oppositely extending casing guide arms 33 and 33' respectively. The internal diameter of each of the casing guides or casing bushings 32, 32' on each of the assemblies thereof disposed along the marine conductor is determined by the outer diameter of the multiple control tube casings to be run therethrough. The outer diameter of these casings, as subsequently described, is dependent upon the number and diameter of control tubes to be contained therein. FIG. 2 shows the marine conductor with the plurality of guide assemblies associated with the marine conductor couplings in place extending between the well 16 and the floating vessel or ship 10.

Referring now particularly to FIGS. 3 and 4, a plurality of multiple control tube casings are run from the floating vessel or ship 10 down through the casing guide means, through the casing guides 32, 32', until they are latched into the remotely acting latching means indicated generally at 120 mounted on the upper part of the blowout preventer stack, indicated generally at 23.

Each of the casing guides or casing bushings 32, 32' are provided with conic or funnel-like flanges 34 and 34' at their top and bottoms respectively, as shown best in FIG. 4.

A plurality of multiple control tube casings may be assembled on board the floating vessel or platform 10 and run down to the well 16 through the casing guides or bushings 32, 32'. As shown in FIG. 3, the control tube casings 35 and 36 may be run individually, casing 35 having been landed in the remotely acting latching means 20, while the casing 36 is indicated as having been partially run toward the aforementioned latching means adjacent the well. Each control tube casing, as casing 35 and 36, are made of metal and contain a plurality of internal control tubes as shown in FIGS. 6 through 8, 11 and 12. The control tube casings are comprised of individual sections of lengths suitable for easy handling on board the vessel or platform 10 and may be assembled on the vessel into continuous strings by means of metal conductor couplings as described in detail in my copending application, Ser. No. 300,277, filed Aug. 6, 1963, and as shown in FIG. 11 generally at 40.

The marine conductor coupling, shown in the exemplary embodiment at 40 in FIG. 11, comprises a first part or annular gib means 41 mounted to the lower end of each control tube casing, as casing 35'. Such mounting between the gib 41 and casing 35' may be accomplished by welding as indicated at 42. A second part termed herein an annular socket or receiver means 43 is mounted on the upper end of each control tube casing, as casing 35 in FIGS. 5 and 11. Socket 43 may be mounted on the upper end of the control tube casing by welding at 44. The first part or gib means 41 is adapted to fit into and be latched within the second part or socket means 43 to effect a rapid coupling of the two conduits 35 and 35'. A latching means, indicated generally at 45, is operable within a wall of the socket means 43 and does not affect other operations conducted within or outside the coupling. Accordingly, the control tube casing strings including a plurality of the couplings indicated generally at 40 may be slid down through the casing guides 32 or 32' positioned at intervals along the marine conductor coupling, as shown in FIG. 3. The lower end of the coupling 40 is chamfered at 46 to facilitate the direction of the coupling through the casing guides upon contact between the chamfered surface 46 and the conic receiving surface 34 on each of the casing guides. While only a single latching means, indicated generally at 45, is shown in FIG. 11, it is preferred that at least three or more of such latching means be disposed about the socket to insure positive latching between the gib 41 and socket 43. Each such latching means may include at least one slidable dog member 47 adapted to slide within the socket wall 43 normal to the axis of the socket into and out of latching engagement with a slot 48 in the gib 41. A vertically aligned latching pin 49 includes an enlarged threaded central portion 50, threadably mounted in the wall of socket 43 and a lower dog penetrating portion 51 having a conical bottom end 52. When the pin 49 is turned down by its head 53 into the position shown in FIG. 11, the dog 47 is held in latching engagement with the circumferential notch 48 in the socket 43. This operation in the assembly of the control tube casings 35 and 36 can be easily accomplished on board the floating vessel or platform prior to the running of the casing through the casing guides. To disassemble the casings, each pin 49 is rotated by its head 53 outwardly of the wall 43 in order to remove the dog penetrating portion 51 from within the bore of dog 47. When the conic portion 52 of the pin 49 is elevated to the conical bore area 54, the dog 47 may slide outwardly releasing the gib 41. A single orienting lug 55 is employed in the exemplary embodiment which is adapted to orient the upper casing 35' relative to the lower casing 35 by the engagement of lug 55 in the slot 56 provided in socket 43.

Each multiple control tube casing, as the casings 35 and 36, are provided with a plurality of control tubes capable of carrying hydraulic fluid under high pressure. The plurality of control tubes in each control tube casing are preferably made of metal tubing and are held therein in a preselected pattern or disposition relative to each other by metal plate retaining means. Further, control tube connecting means are provided at the ends of the control tubes to allow the establishment of fluid-tight connections between successive lengths of control tubes in the respective casings upon the assembly of successive lengths of casings together on board the floating vessel, as by use of the couplings indicated generally at 40. In the preferred embodiment, four control tubes 60, 61, 62 and 63 are provided in each of the control tube casings 35 and/or 36, as best seen in FIGS. 6, 7, 8, 11 and 12. Referring to FIG. 11, in the exemplary embodiment, the control tubes are positioned within the casings 35 and/or 36 by means of the upper and lower retaining plates 64 and 65, respectively. Plates 64 and 65 are provided with ports 66 therein to receive reduced diameter areas 67 on the control tubes and thus positively hold and position the tubes within each of the casings. Also, the plates 64 and 65 may entrap air between the tubes to provide buoyancy to the casing sections. The connecting means for connecting the successive control tube sections upon assembly of the casings 28 include a male connector member 71, to be positioned at the upper end of each control tube, and a female connector member 72, to be connected to the lower end of each control tube. The members 71 and 72 are adapted to effect a fluid-tight conduit connection between the successive control tube sections on their assembly by the stabbing of connector 71 into the connector 72. The connecting means including the connector 71 and 72 may be of any conventional hydraulic line connectors usable with metal tubes where a fluid tight connection is effected on their assembly. In the exemplary embodiment of FIGS. 13 and 13a, however, special check valves are employed in the connecting means where it is desired to hold pressure in the tubes or line. Where the line connection is to the blowout preventer components, for example, this special check valve construction will hold the pressure on the blowout preventer component when the control tubes are removed during a storm or for repairs. The check valves are not required to be used on choke and kill lines, though the exemplary embodiment of check valve in FIGS. 13 and 13a can be employed to effect the fluid type hydraulic connections between the successive control tube sections for all of the control tubes in the plurality of control tube casings, particularly where it is desired to prevent loss of hydraulic fluid on disconnecting the tubes from the well head.

Figure 13A:
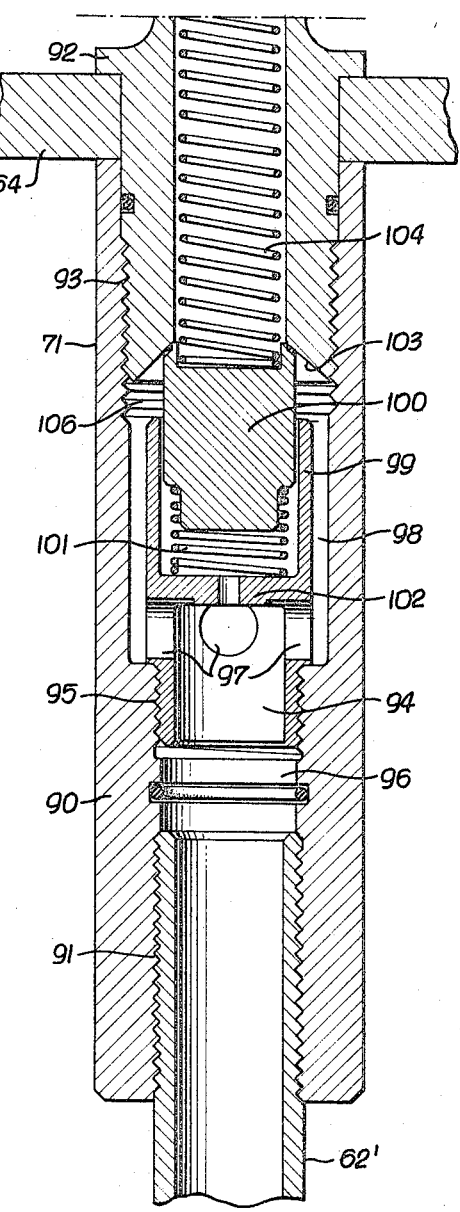

The exemplary embodiment of control tube connector and check valve means, indicated generally at 70, and as best shown in FIGS. 13 and 13a, includes an upper female connector member 72 and a lower male connector member 71, each being mounted on the end of a control tube 62 and 62′ respectively. The female connector member 72 is comprised of a two-part housing including an upper housing portion 73 for mounting the spring bias poppet 74 and a lower housing portion 75 providing a valve seat 76 for the poppet 74 and being adapted by the open ended cavity 77 to receive the male connector 71. Upper housing portion 73 is mounted on the control tube 62 by provision of the threaded connection at 78 and is provided with a seal at 79. A ported valve housing 80 is threadably mounted within the housing 73 by the threaded connection 81 and includes a plurality of large ports 82 communicating to a fluid passageway 83 formed between a cylindrical extension 84 of the member 80 and the housing 73. The poppet 74 is slidably mounted within the cylindrical extension 84 and is spring biased by the spring 85 outwardly thereof from the valve housing center wall 86.

Poppet 74 is provided with a mandrel-like extension 86 which slides within the lower housing portion 75. The mandrel portion 86 of the poppet is provided with a plurality of ports 87 communicating with a space 88 formed between the mandrel 86 and the interior of the lower housing portion 75. Mandrel portion 86 extends into the enlarged cavity 77. Upon the contact of a portion of the male connector portion 71 with the end of mandrel 86 in the chamber 77, sufficient to overcome the spring force of spring 85, poppet 74 can be moved off of the valve seat 76 opening a continuous fluid passage from the chamber 77 to the interior of the control tube 62 through the passage 88, ports 87, valve chamber 89, passage 83 and the ports 82.

Male connector member 71 comprises a two-part housing including the lower housing 90 threadably mounted on the upper end of control tube 62′ by the threaded connection at 91, and an upper male mandrel 92 threadably received in the housing 90 by the threaded connection at 93. A valve housing 94 is threadably mounted within the housing 90 by the threaded connection at 95 and a seal means 96 is provided between the housing 94 and tube 62′ to seal off the threaded connections at 91 and 95 from the interior of the connector. The valve housing 94 in the male connector 71, as in the female connector 72, includes a plurality of large ports 97 communicating between a cylindrical interior of the housing 94 with a cylindrical passageway 98 formed between the hollow cylindrical extension 99 and the interior of the housing 90, as shown in FIG. 13a. A valve poppet 100 is slidably mounted within the cylindrical extension 99 of the valve housing 94 and is spring biased by the spring 101 away from the central ported wall 102 of the valve housing. A valve seat 103 is provided on the lower end of the male mandrel member 92 upon which poppet 100 is seated by the spring 101. Compression of the spring 104 by joining the connectors is designed to be insufficient to force the poppet 100 down within its valve housing 94 against the bias of spring 101 to open the valve by moving poppet 100 off the seat 103. Such opening of the poppet 100, to provide a continuous fluid channel from the interior of the control tube 62′ to the interior of the upper end 105 of the mandrel member 92 through the ports 97, passageway 98 and the valve chamber 106 as accomplished as follows:

From the foregoing detailed description of the male and female connectors 71 and 72 respectively, it can be seen that upon the stabbing of the end 105 of the male mandrel 92 into the cavity 77 of the female connector 72, effecting a fluid tight seal therebetween by means of the conventional seal 107, the inner female mandrel 86 will engage the male connector spring 104. Spring 104 is made larger and stronger than the two springs 101 and 85 associated with the poppets 100 and 74 respectively, so that further movement of mandrel and 105 into the housing 72, into the position shown in FIGS. 13 and 13a, partially compresses the springs 85 and 101. The actual opening of the poppets 74 and 100 is accomplished by pressuring the control tube from the surface and through the provision of further valve opening means provided within the upper poppet 74.

With the male and female connector members 71 and 72 connected, as shown in FIGS. 13 and 13a, wherein the female member mandrel 86 has compressed the spring 104 between the two spring biased poppets 74 and 100 any fluid pressure below the connection is trapped by the lower poppet 100. However, the poppets can be opened and the passage between the successive control tubes cleared by the application of hydraulic fluid pressure through the upper control tube 62 from the surface. Additional valve opening means are provided within the upper poppet 74, acting as a check valve, to allow fluid pressure to pass through the upper poppet and act on the interior of the female mandrel 86 and behind the poppet 100 where it is abutted by spring 104 to cause the poppets to open. In the exemplary embodiment, such means includes the spring bias ball 108 mounted on the spring 109 within a cavity 110 within the poppet 74 to abut against and seal a port 111 in poppet 74 which communicates with the interior of the cylindrical extension 84 on the valve housing 80. The spring 109 is held within the poppet 74 by a retainer 112 screwed into the poppet 74 and which is provided with an interior bore 113 to allow the passage of hydraulic fluid from port 111 past ball 108 to the interior of the mandrel 86. The application of hydraulic fluid pressure in the upper control tube 62, therefore, overcomes the small ball check valve, including the ball 108 and port 111, and causes an opening of the poppets 74 and 100 against the partially compressed springs 85 and 101 respectively. The aforementioned small ball check valve is spring loaded to hold at least 500 p.s.i. so that upon the disconnection of the two members 72 and 71, any hydraulic fluid retained in the control tube 62 above the ball check valve will not be dumped and lost. After the poppet 74 and 100 have been opened by the initial fluid pressure exerted within the female mandrel 86 and the interior of male mandrel member 92, they are held in their recessed housings 84 and 99 out of the flow stream by the heavy spring 104. When the coupling is disengaged, the light springs 85 and 101 behind the poppets force them to seat, after which they are held tightly closed by the line pressure in the respective control tubes.

Referring now again to FIGS. 1 through 3, it can be seen that in the method of running multiple control tube apparatus to a subsea oil well in accordance with the present invention, the first step is the establishment of a plurality of guide lines 18 between a floating platform 10 and a subsea oil well head 17. Then the marine conductor coupling, including a string of conductor pipes 28, is run from the platform 10 to the well head 17 by coupling the successive sections together by the marine conductor couplings 29 on board the vessel or platform 10 and then guiding the conductor pipe string to the well head 17 by guide means 26 associated with the drilling bonnet which is adapted to latch onto the well head, comprising the conductor pipe 17. In the assembly of the individual marine conductor pipes or conduits 35 and/or 36 by the provision of the marine conductor couplings 40, guide means assemblies are concurrently placed at intervals in the conductor by the mounting of the couplings 29 into the conductor 28. This is accomplished in the preferred embodiment by providing the aforedescribed guide means assemblies, including the guide line guides 30, 30' and the casing guides 32, 32', on the marine conductor couplings 29 prior to their assembly into the conductor. Thereafter, a plurality of metal control tube casing strings are assembled on board the vessel by means of the aforementioned marine conductor couplings of a size to pass through the casing guides and the casing strings are run down to the well through the casing guides. As previously described, a connection between the control tubes within the successive casings 29 is automatically accomplished upon the coupling of the successive control tube casings by provision of the aforementioned control tube connecting means.

It is further contemplated in accordance with the present invention that the running of the control tube casings to the well causes an automatic latching of the lower ends thereof within remotely acting latching means and also bring the internal control tubes into fluid tight connections with various hydraulic fluid operated control apparatus at the well site.

Referring now to FIG. 4, the marine conductor indicated generally at 22 is shown latched through a marine conductor latch 24 to a conventional B.O.P. stack, indicated generally at 23, and to the well head or conductor pipe 17 by the drilling bonnet 25. A plurality of remotely operable latch means are also provided at the well head, preferably on the B.O.P. stack as shown in FIG. 4, to receive and automatically latch the multiple control tube casings, as casings 35 and 36 in the exemplary embodiment. Such remotely operable latching means in the exemplary embodiment as shown in detail in FIGS. 6, 7, 8 and 9, inclusive a plurality of latching means, indicated generally at 120, each including a latching receptacle 130, a ball joint 140, a plurality of individual latch mechanisms 150 and a plurality of hydraulic hoses interconnecting the various latching means components.

Latching receptacles 130 are each adapted to receive and latchingly engage or lock therein an enlarged mandrel portion 131 mounted on the end of the control tube casing 28. As best seen in FIGS. 6 and 7, each latching receptacle 130 includes a body portion 132 of generally cylindrical configuration having an upper conical or funnel-like portion 134, to receive the enlarged mandrel 131, and a lower cylindrical base portion 135 threadably received in the ball joint 140 by the threaded connection 136 with the ball 141. A circumferential notch 115 is provided in the mandrel 131 to receive the dogs 151 of the latches 150 protruding into the receptacle 130 through the opening 137.

The latching receptacle is provided with a plurality of control tubes 116 within a lower control tube housing 117 welded to the bottom of the base portion 135. Male connector members 71 are disposed at the upper ends of each of the control tubes 116 to receive and connect into the female connector member 72 to position by plate 65 within the control tube 28. The mandrel 131 provided on the bottom casing 28 of the casing string is provided with an extension 118 to allow connection of the connector 71 and 72 below the area on the mandrel where the latches 150 engage the circumferential notch 115. A pin 119 and slot 114 provide for the proper alignment of the mandrel 131 within the receptacle 130 so that the plurality of connectors 72 align with and properly interengage with the connectors 71.

Ball joint means are provided in association with each latching receptacle 130 to allow limited tilting movement of the associated receptacle up to about 10 degrees from the vertical, as shown in FIG. 7. Such ball joint means in the exemplary embodiments of FIGS. 6, 7 and 9 may comprise the ball joint 140 including the spring loaded ball 141 mounted within a ball joint housing including a lower journal portion 142 and an upper retainer portion 143. Ball member 141 is journaled on a generally spherical seat 144 provided in the housing 142 and is biased into a vertical position by the biasing springs 145 mounted in the housing 142 as shown in FIGS. 6 and 7 and acting on the ball 141 through the ported plate 146 held against the bottom of ball 141 by the springs 145. The interior bore of ball member 141 is threaded to receive and hold the threaded lower portion 135 of the latching receptacle 130. The tilting movement of ball member 141 on the plate 146 within the lower journal housing 142 is limited by the provision of stop or limiting means including the stop pins 147, 147' mounted in the upper housing 143 to engage and limit turning movement of ball 141 through slots 148 provided in upper marginal areas of the ball 141, as shown in FIGS. 6 and 7. Each of the plates 146, lower housing portion 142 and ball joint support arm 149 are ported to allow the lower control tube housing 117 of the latching receptacle 130 to extend downwardly through the ball joint housing 140 and tilt therein up to about 10 degrees from the vertical such maximum tilting being shown in FIG. 7.

A plurality of individual latch mechanisms are provided on each of the aforementioned latching receptacles indicated generally at 130 to automatically latch onto, engage and hold the mandrel 131 of the associated multiple control tube casing string upon its reception into the receptacle 130. As shown in FIGS. 6 through 8, the exemplary latch mechanisms indicated generally at 150 may be mounted about each latching receptacle 130 and be provided with a spring bias dog 151 adapted to act through a port 137 in the receptacle wall 132 to engage and lock into a circumferential notch 115 provided in the mandrel. Each latching mechanism, indicated generally at 150, may include hydraulic means for releasing the associated dog 151 from the casing mandrel 131 by the application of hydraulic pressure to a piston within the latch mechanism associated with the dog. Such hydraulic pressure is supplied to each latch mechanism to hydraulic hose means interconnected with the control tubes 116 provided within the latching receptacle housing 117, as subsequently described.

Referring to FIG. 10, the exemplary latch mechanism comprises a hydraulic cylinder 152 including a cylindrical body 153 provided with axially ported cylinder ends 154 and 155. The dog 151 is provided with a multi-diameter internal bore 156 and is mounted on a multi-diameter push-pull rod 157. The cylindrical portion 158 of rod 157 is adapted to push dog 151 by its small diameter central portion 159 against the mandrel 131 while the end piston element 160 on rod 157 is adapted to pull against dog portion 159 to remove the dog from the notched mandrel 131. Rod 157 is journaled in the cylinder ends 154 and 155 to slide axially of the hydraulic cylinder 152 under the urging of spring 161 against the piston 162 mounted on rod 157 within the cylinder 153. Additional end plates 163 and 164 together with the bolts 165 serve to hold the cylinder body 153 and cylinder ends 154 and 155 assembled to the receptacle wall 132. A pair of seal rings 166 and 167 are also held in place in the cylinder ends 154 and 155, respectively, about the rod 157 by the additional plate ends 163 and 164, as shown in FIG. 12.

Means are provided for supplying hydraulic pressure to the hydraulic cylinder 152 on the side of piston 162 toward the dog 151 to effect a remotely activated unlatching of the control tube casing string from the latching receptacle 130. Such hydraulic pressuring means in the preferred embodiment includes the provision of a hydraulic fluid passageway 168 in the cylinder end 155 communicating past rod 157 into the interior of the hydraulic cylinder 152 on the forward side of piston 162 toward the dog 151, the connector 169 mounted on the end 155 in fluid communication with passageway 168 and a hydraulic hose 170 interconnected into the control tube end connector 171 on the bottom end of one of the control tubes 116, as shown in FIGS. 6 and 7. Application of hydraulic fluid pressure through a preselected control tube in the multiple control tube casings 35 and/ or 36 can thus selectively cause release of the latch mechanisms, indicated generally at 150, remotely of the floating vessel or platform 10. A second port or passageway 172 provided in the other cylinder end 154 which communicates with the interior of the hydraulic cylinder 152 on the spring side of piston 162 may be connected to a hydraulic fluid accumulator mounted on the exterior of the latch mechanism of B.O.P. stack, or it can be interconnected through a connector 173 and hydraulic hose 174 to another of the control tubes 116, as shown in FIGS. 6 and 7, to allow the introduction of hydraulic fluid pressure on the spring side of piston 162. Such application of hydraulic pressure on the spring side of piston 162 after the landing of the casing string upon the latching receptacle can serve to insure a completed latching engagement between the dogs 151 of the various latch mechanisms with the notch 115 in the associated control tube casing mandrel 131.

Manual override means may also be provided to allow a manual release of the dogs 151 by a diver should the hydraulic means previously described fail in their operation for any reason. Such override means in the exemplary embodiment includes a jack screw provided on each latch mechanism including a bolt head 175 with a threaded hollow interior of greater extent than the protrusion of the end of rod 157 from within the hydraulic cylinder 152. The protruding end 176 of rod 157 is also threaded so that rotation of cap 175 turns it down on the rod end 176 into engagement with the hydraulic cylinder 152 at the seal 166. Further rotation of cap 175 will serve to withdraw the rod 157 and consequently the dog 151, piston 160 pulling against dog center portion 159, to release the dog from the mandrel 131.

From the foregoing, it can be seen that the individual latch mechanisms, indicated generally at 150, will automatically latch the control tube casing 131 within the latching receptacle, indicated generally at 130, upon reception of the mandrel 131 therein and upon the selective application of hydraulic pressure through one of the control tubes within the casing 35 and/or 36 will release the mandrel 131 and allow the withdrawal of the multiple control tube casing string up through the casing guides to the floating platform or vessel 10 for disassembly for purposes of repair or storage.

Flexible hydraulic hoses, indicated generally at 180, may be connected between the control tubes 116 within the ball joint 140 and the various hydraulically actuated control devices at the well head, as best shown in FIGS. 4 and 5. A single control tube may be interconnected with three latch mechanisms to control their release simultaneously as, shown, or individual control tubes can be used for each individual latch mechanism. Where the latch mechanisms employ hydraulic means to assist seating of the dog, as previously explained, additional hose connections to each latch mechanism may be provided as shown in FIGS. 4 and 5. Any number of control tubes may be mounted to the control tube casing, four such tubes being shown in FIGS. 6 through 8 and eight tubes in FIGS. 11 and 12 by way of example. Large tubes may be used on choke and kill lines while small tubes may be used to operate latch mechanisms, or the like. Other controls such as the blow-out preventer, indicated generally at 23, and the drilling bonnet latches, indicated generally at 181, or other well control apparatus actuated by hydraulic pressure may also be controlled by the methods and apparatus of the present invention, the embodiment of FIGS. 1 through 4 and 6 through 13b already described being exemplary only.

An alternative exemplary embodiment of apparatus in accordance with the present invention is shown in FIG. 5. There, the marine conductor conduit is run to the well head by guide means 26, but the control tube casings, as casing means 35, are run independently of the conductor pipe by guide means associated with the control tube casing and the individual latching means, as the latching receptacle 130. In this alternative exemplary embodiment, the control tube guide means, indicated generally at 190, includes a guide line anchor 191 mounted on each latching means receptacle, a pair of guide lines 192 and guide 193 mounted to the control tube casing by opposed arms 194.

Another exemplary embodiment of the multiple control tube method and apparatus for establishing a plurality of hydraulic control lines between a floating platform or vessel and well head controls at a subsea well is shown in FIGS. 14 through 16. In this exemplary embodiment, the control tubes are mounted to and spaced about the casing means, which in the exemplary embodiment is a marine conductor pipe, to be assembled on board the vessel or platform and run to a subsea well head for drilling, completion, production or re-entry operations. As shown in FIG. 14, the marine conductor 228 may be run to the well head by guide means associated with the coupling 24 and guide lines 18 as in the prior embodiments, there being a blow-out preventer stack, indicated generally at 23, below coupling 24 and mounted on the well head by the drilling bonnet 25.

In this alternative exemplary embodiment, the conductor pipe or casing means 228 is provided with a plurality of control tube sections 216, which may be of varying diameters and of any desired number, mounted to spacing and orienting means, including the ported flanges 264, 264' on each casing section. As shown in FIGS. 15 and 16, the means for mounting and spacing the plurality of control tubes to each casing section may include the addition of the ported flange 264' on the mandrel or gib portion 241, which may comprise the gib 41 of FIG. 11, at the lower end of each control tube casing section. The upper end of each control tube casing section may include a socket or gib receiving member 243, as the socket 43 of FIG. 11, with the addition of the ported flange 264. The member 243 in FIG. 16 is shown welded to a short casing section 228' which is bolted to the coupling 24, a similar member is welded to the upper end of each control tube casing section 228 in like manner to facilitate the assembly of the control tube casing string. Control tube connecting means are also mounted to the ends of each of the control tubes and held within the casing flanges 264 and 264' as shown in FIG. 16. Such means may include the male connector members 271, which may be of different sizes as shown for different size control tubes, and cooperating female connector members 272. Fluid tight seals are effected on the assembly of the connector members, as shown, by the provision of sealing means 207 within each of the female members 72. In the case of the connectors 272 on the lowermost socket means 243, shown in FIG. 16, which is mounted on the coupling 24 just above the blow out preventer stack 23, additional hose adapter connectors 273 may be provided to connect the control tubes into flexible hoses 274 which may be run to the various latch mechanisms and blow out preventers, as shown in FIG. 14, or to any other hydraulically actuated well head control. The apparatus of FIGS. 14 through 16 may be disconnected from the well head at the bonnet 25 by actuating the release of the latch mechanisms, indicated generally at 250, or if it is desired to leave the blow-out preventer stack on the well head and maintain well pressures, by disconnecting the control tube casings at the lower most casing connection 241–243 shown in FIGS. 14 and 16. While the latching mechanism of FIG. 11 is shown at 45 in the exemplary embodiment of FIGS. 14 through 16, a remotely releasable latching means, as in the exemplary embodiment of FIG. 10, may be mounted on the socket member 243, as in the example of FIGS. 6 through 8 with the latching receptacle, to make member 243 a remotely operable latching receptacle as the prior receptacle 130. Further, the connecting means including the connector members 271 and 272 may include the check valve mechanisms of the exemplary embodiment of FIGS. 13 and 13a to retain hydraulic fluid in tubes 216 and hold pressures on the blow-out preventers and other well head controls on disengagement of the casing section 228″ of FIGS. 14 and 16 from the socket or latching receptacle 243.

Having thus described exemplary embodiments of the multiple control tube method and apparatus according to the present invention, it can be seen a plurality of hydraulic control lines or conduits may be readily and easily established between a floating vessel or platform and a subsea well head without the use of long flexible hose lines, large hose reels or the related necessary handling and associated equipment. The control tube connections established according to the present invention can be accomplished in conjunction with the running of a marine conductor casing, additional control tubing casing, or any casing means run between the floating vessel and well head. Further, the connections so made may be disconnected at the well head by application of hydraulic pressure from the remote vessel and the control tubes and casing means, or in the first two embodiments either the conductor pipe or control tube casings or both, may be removed from the sea for repairs, adjustments or preparatory to subsequent well operations without losing hydraulic fluid in the control tubes and without losing control pressures on the well head control devices.

It should be understood that other alternatives, modifications, alterations or adaptations of the exemplary embodiments herein disclosed may be made within the scope of the present invention which is defined and limited only by the following claims.

I claim:

1. A multiple control tube apparatus for use at a subsea well installation where hydraulically actuated controls at the well head are to be operated from a floating platform remote from the well head, said multiple control tube apparatus comprising:
   casing means for connecting a floating vessel with a subsea well head assembly, said casing means including a plurality of rigid casing sections to be joined together successively on board said vessel and run to said well head assembly and
   a plurality of control tube sections disposed internally of each of said casing sections to be aligned with and joined to adjacent tube sections of adjacent casing sections on assembly of said casing sections to provide a plurality of continuous internal control tube conduits mounted within said casing means for conveying hydraulic pressure fluid between said vessel and well head assembly on connecting said casing means to said well head assembly.

2. A multiple control tube apparatus for use at subsea wells where it is desired to supply hydraulic pressure fluid to the well head assembly from a remote floating vessel to selectively operate hydraulically actuated control devices at the well head, said multiple control tube apparatus comprising:
   casing means for connecting a floating vessel with a subsea well head assembly, said casing means including a plurality of rigid casing sections and coupling means thereon for successively joining said sections on said vessel and lowering them to the well head assembly;
   a plurality of rigid tube means associated with each of said casing sections for alignment and connection with tube means in each adjacent casing section on assembly between said vessel and well head assembly; and
   tube connecting means on the ends of tube means of each said casing section for interconnecting aligned tubes of adjacent casing sections on assembly of said casing sections to provide a plurality of continuous conduits within said casing means communicating between said vessel and said well head to carry hydraulic pressure fluid between said vessel and said well head.

3. A multiple control tube casing section for use in establishing a plurality of hydraulic pressure fluid conduits between a floating vessel and a subsea well head assembly without the need for additional buoyancy means to buoy the conduits, said casing section comprising:
   a rigid tubular body;
   coupling means on each end of said body for coupling said body to adjacent casing sections;
   a plurality of control tubes within said body and extending longitudinally thereof;
   means for laterally spacing said tubes within said body and for entrapping air within said body between said axially spaced tubes to provide buoyancy to said body; and
   tube connecting means on each end of each of said control tubes for automatically connecting each of said tubes to similar tubes in an adjacent casing section on coupling of said body to said adjacent casing section,
   said coupling means including aligning means for aligning said tubes in said body with tubes of an adjacent body on coupling thereto.

4. A multiple control tube and guide device for use at subsea well installations where a conductor pipe is provided between a well head and a floating vessel remote from the well and hydraulically actuated control apparatus at the well head assembly are to be operated by application of hydraulic fluid from the vessel through fluid conduits to the well head, said control tube and guide device comprising:
   casing means for connecting the floating vessel with the well head assembly, said casing means including a plurality of rigid casing sections and casing coupling means on each of said casing sections for joining said casing sections together on said vessel;
   rigid tube means mounted to each of said casing sections including a plurality of rigid tubes, spacer means for laterally spacing said tubes about said casing sections and tube connecting means at each end of said tubes for connecting successive tubes of adjacent casing sections upon alignment of said tubes and joining of said adjacent casing sections;
   guide means for guiding said casing means from said vessel to said well head on assembly of said casing sections and running them to said well head,
   said tubes providing a plurality of continuous fluid conduits between said vessel and said well head; and
   latching means on said well head assembly for receiving and latching onto the lower casing section of said casing means when said casing means is run from said vessel to said well head assembly, said latching means including tube connecting means for connecting into the tubes of said lower casing section on latching thereto and fluid conduit means associated with hydraulically actuated control apparatus at the well head for interconnecting said tubes with said control apparatus upon latching of said lower casing section into said latching means, said latching means further including a plurality of hydraulically releasable, spring actuated latches, each said latches comprising:
   a fluid tight cylinder mounted to an outer wall of said latching means at a port therein and at generally right angles thereto;
   a latching dog having a forward contact surface shaped to conform to an outer surface of a casing section received in said latching means;
   rod means mounting said dog including a piston-like portion within said cylinder;
   means for mounting said rod means, piston-like portion and dog for axial movement relative to said cylinder into and out of latching position wherein said dog abuts said casing section within said latching means;
   spring means within said cylinder on one side of said piston-like means biasing said rod means into said latching position; and hydraulic pressure fluid passage means for interconnecting an interior of said cylinder on a side of said piston-like portion opposite said spring means for transmitting hydraulic pressure fluid from an external source into said cylinder against said piston-like portion counter to the bias of said spring means to move said dog out of said latching position.

5. A multiple control tube apparatus as in claim 4 wherein the tube connecting means on the ends of at least one of the tubes in a casing section and one of the tubes in said latching means comprises:

a male connector member mounted on the end of a first tube of two tubes to be connected between a casing section and said latching means, said male connector member including a hollow extension portion, a check valve means including a spring biased poppet and an associated valve seat to allow one-way fluid flow through said first tube and resilient means in said hollow extension and associated with said poppet;

a female connector member mounted on an end of a second tube to engage said male connector, said female connector member including a cavity portion to receive said hollow extension, seal means in said cavity to seal about said extension, check valve means including a spring biased poppet and an associated valve seat to allow one-way fluid flow through said second tube, a hollow mandrel associated with said last-named poppet and protruding into said cavity portion to enter said hollow extension on connection of said members to compress said resilient means to diminish the spring biases on said poppets; and check valve venting means associated with one of said check valves and operable to vent fluid at a predetermined pressure past said one of said check valves to open said check valves by application of hydraulic pressure against said poppets to overcome said diminished spring biases on said poppets.

6. The device of claim 4 wherein said latching means include ball joint suspension means for mounting said latching means for axial tilting relative to the vertical to facilitate reception and latching onto a casing section received in said latching means.

7. A control tube apparatus to be employed at a subsea oil well installation wherein a conductor pipe is run from a floating platform to a head of the well by a plurality of guide lines interconnected between a floating platform and a subsea oil well and hydraulically actuated well control apparatus at the well head are to be operated by application of hydraulic fluid pressure from the platform remote from the well head, said control tube apparatus comprising:

a plurality of guide means to be associated with the conductor pipe run between the platform and well at spaced intervals along the pipe, said guide means including line guides to guide said conductor pipe relative to said guide lines and additional casing guides to guide casing strings from said platform alongside said conductor pipe to said well;

a plurality of control tube casings to be assembled into casing strings on said platform and run from said platform to said well through said casing guides;

a plurality of control tubes in each of said control tube casings; and fluid tight connecting means on the ends of each said control tube for interconnecting successive control tubes in fluid tight control tube strings within the casing string upon assembly of said casings, whereby hydraulic pressure fluid may be selectively transmitted from said floating vessel through said control tube strings to said well head.

8. The control tube apparatus of claim 7 including latching means to be associated with the subsea well head for receiving and automatically latching onto lower ends of said casing strings upon their being run to said well head through said casing guides, said latching means including fluid-tight connection means for automatically interconnecting with each of said control tube strings within said casing string upon reception and latching of said string into said latching means.

9. The control tube apparatus of claim 8 including flexible hydraulic fluid pressure hoses for interconnecting said fluid-tight connecting means of said latching means with hydraulically-operated subsea well control apparatus.

10. The control tube apparatus of claim 9 in which said subsea well control apparatus includes a plurality of hydraulically releasable spring actuated latches, each latch comprising:

a hydraulic pressure fluid cylinder;

a latching dog;

rod means mounting said dog for movement axially of said cylinder into and out of a latching position;

means for spring biasing said rod and dog into said latching position to automatically latch onto a lower end of a casing string; and means for applying hydraulic pressure to said rod within said cylinder to move said dog out of said latching position including means interconnecting the interior of said cylinder with at least one of said hoses.

11. A remotely latching control tube apparatus to be used with a subsea oil well comprising:

a plurality of guide lines interconnecting a floating platform and a subsea oil well head;

a plurality of guide assemblies associated with a conductor pipe run from said platform to said well head, each said assembly including a plurality of guide means associated with said guide lines for directing said assemblies along said guide lines and a plurality of casing guide means for directing strings of casings from said platform to said well head;

latching receptacle means associated with a lower end of the conductor pipe adjacent the well head for receiving and automatically latching the lower ends of casing strings upon engagement therebetween, said means including receptacles aligned with said casing guide means; and a plurality of casings assembled and run as strings of casings from said platform through said casing guide means to said latching receptacle means, each said casing including a plurality of internal control tubes to convey fluid under pressure between said platform and said latching receptacle means when said strings are latched into said receptacle means and means for entrapping air within said casings between said tubes to buoy said casings.

12. A guide and remotely operable latching apparatus for use in running a plurality of strings of control tube casings from a floating platform to a subsea oil well comprising:

a plurality of guide lines interconnecting a floating platform and a subsea well head;

a plurality of casing guide means for guiding control tube casing strings run from said platform to adjacent said well head, each said guide means being associated with a marine conductor run from said platform to said well head; and latching receptacle means associated with a lower end of the conductor and adjacent said well head for receiving and latching a lower end of each said control tube casing strings upon reception therein.

13. A guide and remotely operable latching apparatus as in claim 12 wherein each said casing guide means comprises a first pair of opposed arms including annular guide means at the end of each for receiving said guide lines to guide said conductor to said well head and a second pair of opposed arms including annular guide means for receiving said control tube casings therethrough.

14. A multiple control tube guide apparatus for use with subsea oil well installations for guiding a multiplicity of control tubes to a control apparatus on a well head comprising:

a plurality of guide lines interconnecting a platform above sea level and a subsea oil well head;

a marine conductor;

a plurality of guide means associated with said conductor to guide said conductor to said well by said guide lines;

coupling means on a bottom end of said conductor for coupling said conductor to said well upon engaging a well head portion of said well;

control tube connecting means associated with a lower end of said conductor for latching control tubes independently run into fluid engagement with control apparatus on said well head; and a plurality of control tube guides associated with said conductor for guiding a plurality of control tubes run through said tube guides to said control tube latching means after said conductor is coupled to said well.

15. A method of establishing a plurality of hydraulic fluid control lines between a subsea well head assembly and a remote floating platform comprising the steps of:

establishing a guiding means between the floating platform and subsea well head;

assembling rigid casing sections each containing a plurality of tubular conduits and entrapped air spaces therebetween on board the platform and lowering them in a string of casing sections as assembled;

guiding said string of casing sections to said well head by the established guide means;

latching the lower end of said string into latching means at the well head and concurrently interconnecting each said inner tubular conduit with a fluid conduit to a hydraulically actuated control associated with said well head; and selectively operating controls at said well head from said platform by selectively pressurizing hydraulic fluid through the conduits established between the floating platform and the controls at the well head.

16. A method of running control tube apparatus to an underwater well to be operated by fluid pressure transmitted through control tubes comprising the steps of;

establishing a plurality of guide lines between a floating platform and a subsea oil well head;

running a string of conductor pipe from said platform to said well head by coupling successive sections thereof together on said platform;

guiding said string of conductor pipe to said well head by guide means associated therewith running on said guide lines;

running a plurality of control tube casing strings independently of said conductor pipe from said platform to said well head by coupling successive sections thereof on said platform; and guiding said casing strings to said well head after said conductor pipe string has been run to said well head by guide means associated with said conductor pipe string.

17. A conduit connector including two parts to be mounted on ends of separate conduits and effect a fluid tight connection therebetween upon assembly of said two parts, said connector comprising:

a first part to be mounted on a first conduit end including a check valve means for limiting fluid flow from said first conduit;

a second part to be mounted on a second conduit end including a second check valve means for limiting fluid from said second conduit; and third check valve means provided in one of said first or second check valve means for allowing passage of fluid through said first or second check valve means at predetermined conduit pressure whereby said first and second check valve means are opened by predetermined conduit fluid pressure.

18. A conduit connector including two parts to be mounted on separate conduit ends to effect a fluid tight connection between said conduits upon their assembly to each other and to retain internal conduit fluid pressure upon their disassembly, each said connector including:

a male connector member to be mounted on the end of a first conduit to receive pressure fluid, said male connector member including a hollow extension portion to enter a female connector, a first check valve means to prevent fluid delivered to said first conduit from escaping out of said conduit when not connected and resilient means in said hollow extension abutting said check valve means;

a female connector member to be mounted on the end of a second conduit to deliver pressure fluid through of the connector, said female connector member including a cavity portion to receive said hollow extension, seal means in said cavity portion to seal on said extension when inserted into said cavity, a second check valve means to limit passage of fluid through said second conduit to said connector and a hollow mandrel associated with said second check valve means and protruding into said cavity to enter said hollow extension of said male connector to compress said resilient means on assembly of said connectors;

biasing means biasing each of said first and second check valves into closed positions, compression of said resilient means between said check valve means diminishing said closing bias; and third check valve means in said female connector to allow passage of fluid at a predetermined pressure from said second conduit past said second check valve means into the interior of the connector between said first and second check valve means, said passage of fluid at a predetermined pressure from said second conduit into the interior of the connector serving to open said first and second check valve means to place said first and second conduits in fluid tight communication, said first and second check valve means closing under the effect of the biasing means and internal conduit fluid pressure upon the disconnection of said connectors.

19. A conduit connector including two parts to be mounted on separate conduits and to effect a fluid tight connection between said conduits upon assembly of the two parts together, said connector comprising:

a male connector member to be mounted on a first conduit end including a hollow mandrel extension portion and a first internal check valve means to limit the passage of fluid therethrough out of said first conduit;

a female connector member to be mounted on a second conduit end including a cavity portion to receive said mandrel extension, fluid seal means about said cavity to seal upon said mandrel and a second internal check valve means to limit passage of fluid out of said second conduit; and a spring biased ball check valve in one of said check valves to allow passage of fluid therethrough to open said check valves at a predetermined fluid pressure acting on said one of said check valves.

20. In a multiple control tube apparatus wherein a plurality of control tube casings are assembled and run as casing strings from a floating platform to a subsea well, each casing including a plurality of control tubes, the provision of control tube connecting means comprising:

a male connector member mounted on the upper end of a control tube to receive fluid under pressure from a preceding tube, said male connector member including a hollow extension portion to enter a female connector, a first check valve means including a spring biased poppet and associated valve seat to allow passage of fluid into said control tube against a spring bias and prevent escape of any such fluid from said control tube by said poppet seating on said valve seat and resilient means in said hollow extension and abutting said poppet;

a female connector member to be mounted on the lower end of a control tube to deliver fluid under pressure to a succeeding tube, said female connector member including a cavity portion to receive a hollow extension of a male connector member, seal means in said cavity portion to seal on such extension receiving in said cavity portion, a second check valve means including a spring biased poppet and associated valve seat to prevent passage of fluid under pressure therethrough into said succeeding tube when closed under its spring bias, a hollow mandrel associated with said second check valve poppet end protruding into said cavity portion to enter a hollow extension of a male connector received in said cavity portion and compress a resilient means in said hollow extension, compression of the resilient means on assembly of male and female connectors serving to diminish the closing bias acting on the respective check valve poppet; and third check valve means in said female connector operable at a predetermined fluid pressure within the associated control tube to bypass said second check valve means into an interior of the assembly connector between said check valves and open said check valves by overcoming the diminished closing bias acting on the respective valve poppet.

21. A method of establishing a plurality of hydraulic fluid control lines between a subsea well head assembly and a remote floating platform comprising the steps of:
providing a plurality of tubing sections within each of a plurality of casing sections;
assembling said tubing sections into strings of tubes concurrently with the assembly of said casing sections into casing strings;
concurrently running said casing and tubing sections to said well head; and
latching a lower end of each of said casing strings to said well head by remotely acting latching means thereon operable by insertion of a casing string end therein and concurrently bringing tubing strings within said casing strings into fluid-tight communication with conduit means within said latching means.

22. A multiple control tube and guide device for use at subsea well installations where a conductor pipe is provided between a well head and a floating vessel remote from the well and hydraulically actuated control apparatus at the well head assembly are to be operated by application of hydraulic fluid from the vessel through fluid conduits to the well head, said control tube and guide device comprising:

casing means for connecting the floating vessel with the well head assembly, said casing means including a plurality of rigid casing sections and casing coupling means on each of said casing sections for joining said casing sections together on said vessel;

rigid tube means within each of said casing sections including spacer means for laterally spacing said tube means about said casing sections and tube connecting means at each end of said tubes tube means for connecting successive tubes of adjacent casing sections upon alignment of said tubes and joining of said adjacent casing sections; and guide means associated with said casing means for guiding said casing means to said well head on assembly of said casing sections and running to said well head, said tube means providing a plurality of continuous fluid conduits between said vessel and said well head.

23. A method of running control tube apparatus to an underwater well to be operated by fluid pressure transmitted through control tubes comprising the steps of:
establishing a plurality of guide lines between a floating platform and a subsea oil well head;
running a string of conductor pipe from said platform to said well head by coupling successive sections thereof together on said platform;
guiding said string of conductor pipe to said well head by guide means associated therewith running on said guide lines;
running a plurality of control tube casing strings from said platform to said well head by coupling successive section thereof on said platform;
guiding said casing strings to said well head by guide means associated with said conductor pipe string; and
latching a lower end of each said casing string to said well head by remotely acting latching means thereon operable by insertion of a casing string end therein and concurrently bringing control tubes within said casings into fluid-tight communication with conduit means within said latching means.

References Cited

UNITED STATES PATENTS

| | | | |
|---|---|---|---|
| 1,862,260 | 6/1932 | Edmunds | 285—140 X |
| 2,212,036 | 8/1940 | Otis | 285—140 X |
| 2,962,096 | 11/1960 | Knox | 166—75 |
| 3,147,992 | 9/1964 | Haeber et al. | 166—.6 |
| 3,186,487 | 6/1965 | Geer et al. | 166—.5 |
| 3,189,098 | 6/1965 | Haeber | 166—.6 |
| 3,280,908 | 10/1966 | Todd | 166—.6 |

CHARLES E. O'CONNELL, *Primary Examiner.*

R. E. FAVREAU, *Assistant Examiner.*